(12) United States Patent
Hirsch et al.

(10) Patent No.: US 11,969,794 B2
(45) Date of Patent: Apr. 30, 2024

(54) METHOD FOR PRESERVING SHAPE OF AN OBJECT DURING SINTERING

(71) Applicant: Stratasys Ltd., Rehovot (IL)

(72) Inventors: Shai Hirsch, Rehovot (IL); Yehoshua Sheinman, RaAnana (IL)

(73) Assignee: Stratasys Ltd., Rehovot (IL)

( * ) Notice: Subject to any disclaimer, the term of this patent is extended or adjusted under 35 U.S.C. 154(b) by 60 days.

(21) Appl. No.: 17/615,141

(22) PCT Filed: May 11, 2020

(86) PCT No.: PCT/IL2020/050507
§ 371 (c)(1),
(2) Date: Nov. 30, 2021

(87) PCT Pub. No.: WO2020/240535
PCT Pub. Date: Dec. 3, 2020

(65) Prior Publication Data
US 2022/0234102 A1 Jul. 28, 2022

Related U.S. Application Data

(60) Provisional application No. 62/854,346, filed on May 30, 2019.

(51) Int. Cl.
*B22F 3/10* (2006.01)
*B22F 10/64* (2021.01)
*B33Y 40/20* (2020.01)

(52) U.S. Cl.
CPC ............ *B22F 3/1003* (2013.01); *B22F 10/64* (2021.01); *B33Y 40/20* (2020.01); *B22F 2003/1042* (2013.01); *B22F 2301/052* (2013.01)

(58) Field of Classification Search
CPC .................. B22F 3/1003; B22F 3/1021; B22F 2003/1042; B22F 2003/1046; B22F 2303/405; B22F 10/10; B22F 10/64; B22F 2301/052; B22F 2302/20; B22F 2302/205; B22F 2302/253; B22F 2302/256; B33Y 40/20
See application file for complete search history.

(56) References Cited

U.S. PATENT DOCUMENTS 5,745,834 A * 4/1998 Bampton ................. B22F 10/34
419/37
2011/0318216 A1* 12/2011 Bowe ..................... B22F 3/1007
419/45

(Continued)

FOREIGN PATENT DOCUMENTS

CN 105338923 A * 2/2016 ......... A61C 13/0006
CN 108311694 7/2018

(Continued)

OTHER PUBLICATIONS

WIPO Machine Translation of CN 105338923 (Year: 2024).*

(Continued)

*Primary Examiner* — Alexandra M Moore

(57) ABSTRACT

A method for preserving the shape of an object during sintering includes filling at least one volume defined by a surface of the object with a plurality of balls, sintering the object together with the balls and separating the object from the balls post sintering. The balls have a diameter of 0.5 mm-12 mm.

23 Claims, 5 Drawing Sheets

(56) References Cited

U.S. PATENT DOCUMENTS

| | | | | |
|---|---|---|---|---|
| 2016/0051350 A1* | 2/2016 | Reichert | ............... | C04B 35/486 264/16 |
| 2018/0297113 A1* | 10/2018 | Preston | ................... | B22F 10/16 |
| 2019/0133727 A1* | 5/2019 | Buschmann | ....... | A61C 13/0022 |
| 2021/0146435 A1* | 5/2021 | Hangai | ................... | B22F 7/006 |

FOREIGN PATENT DOCUMENTS

| | | | | |
|---|---|---|---|---|
| CN | 108607989 | | 10/2018 | |
| DE | 10332882 A1 * | | 2/2005 | ................ B22F 3/10 |
| DE | 202011005465 | | 6/2011 | |
| JP | H-0820804 A * | | 1/1996 | ................ B22F 3/10 |
| WO | WO 2005/009654 | | 2/2005 | |
| WO | WO 2017/179052 | | 10/2017 | |
| WO | WO 2018/173048 | | 9/2018 | |
| WO | WO-2019013026 A1 * | | 1/2019 | ............ B22F 3/1125 |
| WO | WO 2020/240535 | | 12/2020 | |

OTHER PUBLICATIONS

International Preliminary Report on Patentability dated Dec. 9, 2021 From the International Bureau of WIPO Re. Application No. PCT/IL2020/050507. (7 Pages).

International Search Report and the Written Opinion dated Jul. 31, 2020 From the International Searching Authority Re. Application No. PCT/IL2020/050507. (11 Pages).

* cited by examiner

METHOD FOR PRESERVING SHAPE OF AN OBJECT DURING SINTERING

RELATED APPLICATIONS

This application is a National Phase of PCT Patent Application No. PCT/IL2020/050507 having International filing date of May 11, 2020, which claims the benefit of priority under 35 USC § 119(e) of U.S. Provisional Patent Application No. 62/854,346 filed on May 30, 2019, The contents of the above applications are all incorporated by reference as if fully set forth herein in their entirety.

FIELD AND BACKGROUND OF THE INVENTION

The present invention, in some embodiments thereof, relates to the field of sintering objects and, more particularly, but not exclusively, to methods for preserving the shape of three-dimensional (3D) objects during sintering.

Sintering is known to be part of a fabricating process when forming objects from a powder material such as for example metal powder. Sintering strengthens bonding of the powder material in the object so that it coalesces into a solid mass. Example fabrication processes that apply sintering include metal injection molding and additive manufacturing. One example additive manufacturing process is binder jetting. In binder jetting, an inkjet print head moves across a bed of powder, selectively depositing a liquid binding material. This process is repeated over a plurality of layers. When the object is complete, unbound powder is removed and the bound powder is sintered to produce the solidified object.

International Patent Publication No. WO2017/179052 entitled "METHOD AND APPARATUS FOR ADDITIVE MANUFACTURING WITH POWDER MATERIAL," the contents of which are incorporated herein by reference, discloses a system for building a three-dimensional green compact. The system includes a printing station configured to print a mask pattern on a building surface, a powder delivery station configured to apply a layer of powder material on the mask pattern; a die compaction station for compacting the layer formed by the powder material and the mask pattern; and a stage configured to repeatedly advance a building tray to each of the printing station, the powder delivery station and the die compaction station to build a plurality of layers that together form the three-dimensional green compact. The mask pattern is formed of solidifiable material. At the end of the layer building process, the green compact may be positioned in a second compacting station for final compaction and then transferred to a sintering station for sintering. During the sintering process, the mask built by the printing station burns and the green compact solidifies. The mask burning allows the green compact defined within the layerwise perimeters of the mask to be separated from the portion of the layers outside the perimeters.

International Patent Publication No. WO2018/173048 entitled "METHOD AND SYSTEM FOR ADDITIVE MANUFACTURING WITH POWDER MATERIAL," the contents of which are incorporated herein by reference, discloses a method for producing a three-dimensional model via additive manufacturing. The method includes building a green block in a layerwise manner with a powder material and a solidifiable non-powder material. The green block includes a green body. The solidified non-powder material is removed from the green block to extract the green body and the density of the green body is increased by applying Cold Isostatic Pressure (CIP). The green body is then sintered to produce a three-dimensional object.

It is known that an object including for example an overhang may undergo some gravitational deformation (or sagging) of the overhanging portion during sintering. The gravitational deformation may be due to partial liquefaction of the material during sintering. In particular, objects formed from aluminum powder are known to be prone to gravitational deformation during sintering. For objects having a relatively simple geometry, the gravitational deformation may be insignificant. In some cases it may be possible to compensate for an expected deformation based on predicting the type of deformation that will occur and adjusting a shape e.g. dimensions of the object prior to its sintering in a manner that provides the desired object geometry after sintering.

SUMMARY OF THE INVENTION

According to an aspect of some embodiments of the present invention there is provided a method for preserving a shape of a 3D object during sintering based on physically supporting the object during sintering. In this manner, gravitational deformation may be avoided or reduced. The method may be particularly suitable for objects including overhangs, delicate features and/or complex geometries that may be prone to deformation. The method may also be particularly suitable for objects manufactured in small quantities, e.g. as one-off items. In such objects, information on how to adjust geometry to compensate for an expected deformation during sintering may not be available and may be difficult and/or costly to attain. Additive manufacturing is known to be used for manufacturing objects with delicate features or complex geometries and is also known to be used for manufacturing one-off items. The methods as described herein may be suitable for objects formed by additive manufacturing and may address challenges associated with sintering objects that are formed by additive manufacturing. Optionally, the method is suitable for objects formed with an aluminum powder. Optionally, the method is also suitable for sintering 3D objects formed with other materials such as aluminum alloy, other metal powders, powdered ceramic material, powdered plastic polymer material or any combination of powdered materials.

According to some example embodiments, the method includes supporting the 3D object during sintering with a plurality of balls that are configured to fill cavities, fill gaps, support overhangs and/or generally support portions in the object that may be prone to deformation during the sintering process. The balls are configured to stay intact during sintering and separate from the object post-sintering. Optionally, entire portions or the entire 3D object may be immersed in a bath or pool of the balls during sintering. The balls may be formed with a same or different material than the material of the object being sintered. In some example embodiments, adherence of the balls to a surface of the object is avoided by placing the object in a bag including inert sand and immersing the bag including the inert sand and the object in a pool of s. The inert sand may provide a physical separation between the object and the balls during sintering. The bag may be a mesh that is formed with a material that does not liquefy during sintering.

In some example embodiments, the balls are selected to have a diameter that is small enough to penetrate cavities or gaps within the 3D object and at the same time large enough to provide adequate air flow through a layer of balls. The air flow may improve purging of the atmosphere to release any moisture and oxygen that might otherwise be trapped around the object. Optionally, the diameter of the balls is selected to be 2-10 mm e.g., 2-6 mm or 2-3 mm, and may be selected based on the geometry and size of the 3D object being built. The material of the balls may be selected to have a relatively high thermal conductivity, e.g. aluminum.

According to an aspect of some example embodiments, there is provided a method for preserving the shape of an object during sintering, the method comprising: filling at least one volume defined by a surface of the object with a plurality of balls, wherein each ball has a diameter of 0.5 mm-12 mm; sintering the object together with the balls; and separating the object from the balls post sintering.

Optionally, the method includes immersing the object in a pool of the balls; and sintering the object while immersed in the pool.

Optionally, the pool of balls is housed in a cage formed with a mesh or grid.

Optionally, the cage is formed from stainless steel.

Optionally, the method includes forming a barrier between the plurality of balls and the surface of the object with inert sand; and sintering the object with the barrier.

Optionally, the method includes placing the object and the inert sand in a bag; and sintering the object in the bag with the inert sand.

Optionally, the plurality of balls is contained in a bag and wherein the inert sand forms barrier between the surface of the object and the bag.

Optionally, the bag is formed with a mesh of stainless steel.

Optionally, the balls are formed with aluminum.

Optionally, the balls are formed with ceramic material.

Optionally, the ceramic material is boron nitride or aluminum nitride.

Optionally, the balls are configured with a smooth outer surface.

Optionally, the balls are solid balls.

Optionally, the balls include an oxide layer.

Optionally, the balls are treated to increase thickness of the oxide layer.

Optionally, the balls are spherical in shape.

Optionally, the balls in the plurality of balls have a same diameter.

Optionally, the balls in the plurality of balls have different diameters.

Optionally, a first volume defined by the surface of the object is filled with balls having a first diameter and a second volume defined by the surface of the object is filled with balls having a second diameter, wherein the second diameter is other than the first diameter.

Optionally, a size of the balls is selected based on a size and shape of the object.

Optionally, the balls in the plurality have a diameter of 2 mm-6 mm.

Optionally, the object is formed by additive manufacturing.

Optionally, the object is formed with aluminum powder.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
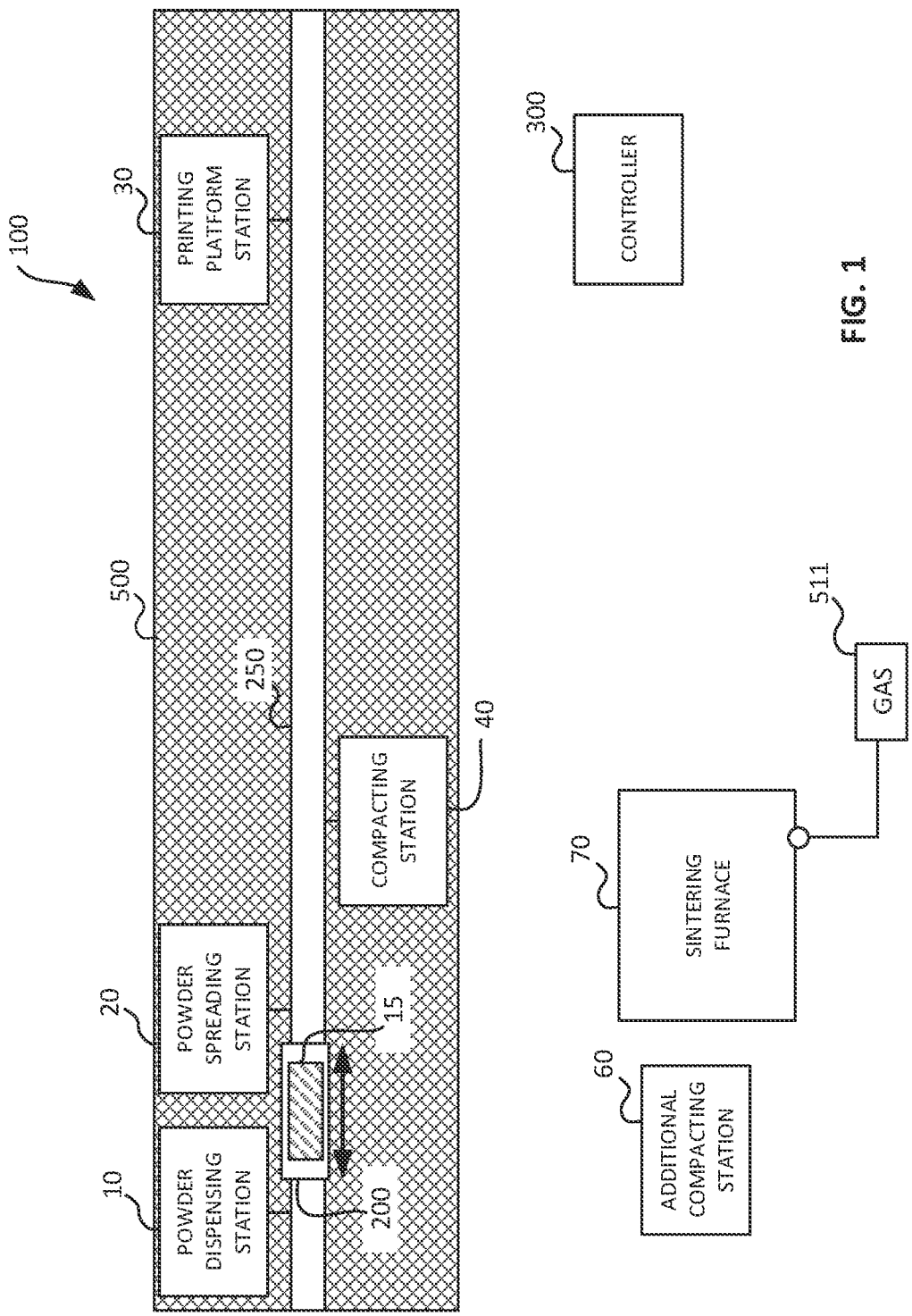
FIG. 1 is a simplified schematic drawing of an example additive manufacturing system.

The present invention, in some embodiments thereof, relates to the field of sintering objects and, more particularly, but not exclusively, to methods for preserving the shape of 3D objects during sintering.

Known powder metallurgy objects formed by methods other than additive manufacturing often have relatively simple shapes and are usually manufactured in large quantities. In such applications, custom supports may be made to support the object/s during sintering and thereby avoid gravitational deformation. In addition, the object may go through a process after sintering to correct for deformations. Optionally, the shape of the object may be pre-adjusted to compensate for an expected deformation. Often these methods are sufficient.

With the emergence of additive manufacturing, objects with more complex geometries may be produced. Furthermore, it is economically feasible to produce objects in low quantities, e.g. as one-off items based on additive manufacturing while this may not be the case for other more traditional types of manufacturing methods. These advantages afforded by additive manufacturing are however accompanied by some challenges. One such challenge is maintaining the desired shape of the object during the sintering process. Traditional methods of building custom supports and post-processing to correct for deformation may not be feasible for objects that have complex shapes or that are manufactured in small quantities. Some delicate features may be particularly prone to deformation and even small deformations in these delicate features may deem the object unusable for its intended purpose. Objects formed from powdered aluminum may be particularly susceptible to gravitational deformation (or sagging) during sintering. However, gravitational deformation may also occur in objects formed of other materials, e.g. other metal powders, powdered ceramic material, powdered plastic polymer material and various alloys.

One method to maintain the geometry of an object during sintering may be to suspend the object in an inert sand, e.g. in alumina during sintering. This method has several drawbacks. Heat conductivity through inert sand may be relatively low and this low heat conductivity may prolong duration of the sintering process and may also lead to temperature gradients in the object being sintered which may adversely affect the sintering process. The inert sand may also trap oxygen and moisture around the object because of its low gas permeability. Oxygen and moisture are known to adversely affect the sintering process.

According to some example embodiments, there is provided a method that includes suspending an object or portions of an object in a pool or bath of balls rather than a pool of inert sand. As used herein a 'ball' may refer to a spherical element, a particle, a pellet and these terms may be used interchangeably. In addition, a ball may refer to either a hollow or full structure. In some example embodiments, the balls are configured to be highly heat conductive. Optionally, the balls are formed from ceramics, e.g. boron nitride or aluminum nitride or formed from metal, e.g. aluminum. The balls may generally be round or may have other geometric shapes, e.g. irregular shapes such as in a coarse powder. In some example embodiments, aluminum balls are used. In some example embodiments, aluminum balls are advantageous as they have a relatively high thermal conductivity, e.g. thermal conductivity of about 50 W/mK-380 W/mK and due to this, the duration of sintering may be reduced and thermal gradients may be avoided in comparison to sintering with inert sand.

According to some example embodiments, the balls have a diameter of 0.5 mm-12 mm, e.g. 1 mm-10 mm, 1.5 mm-6 mm or 2 mm-3 mm. In some embodiments the diameter (or average diameter) of the ball is at least 500 µm or at least 1 mm. Optionally, the diameter of the balls may be selected based on the size and shape i.e. dimensions and geometry of the object to be sintered. In some example embodiments, the size of the balls is selected so as to penetrate cavities or gaps in the object being built and to provide enough contact points with the object to physically support overhangs and/or subsequent layers of material and adequately spread the load of materials across the overhanging portion. At the same time, the size of the balls is also selected so as to allow adequate air flow and lower temperature gradients.

According to some example embodiments, the balls are configured not to undergo liquefaction during sintering. Optionally, the balls are configured to have a smooth surface to lower contact surface area and reduce adherence to the object during sintering. In some example embodiments, the balls are configured to be covered in an oxide layer that protects the balls from liquefaction during sintering. Optionally, the balls are chemically treated to increase the oxide layer. The balls may be an off the shelf product or may be manufactured specifically for supporting geometry of a particular object being sintered. The balls may also be reusable.

Although the methods described herein may be particularly suited for preserving the shape of an object formed by additive manufacturing, they may also be applied to sintering of objects formed by other manufacturing methods, including traditional manufacturing methods, without deformation.

Figure 2:
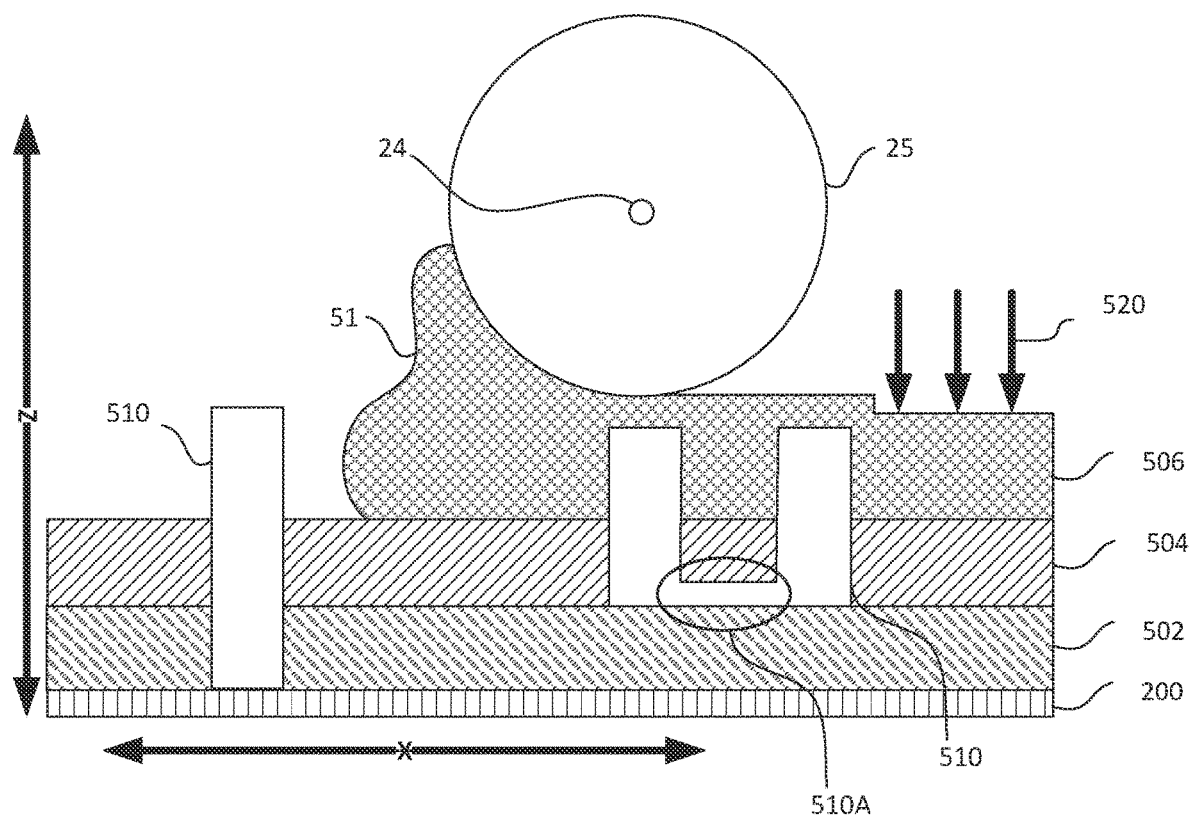
FIG. 2 is a simplified schematic drawing of an exemplary per layer building process (side-view)
Figure 3:
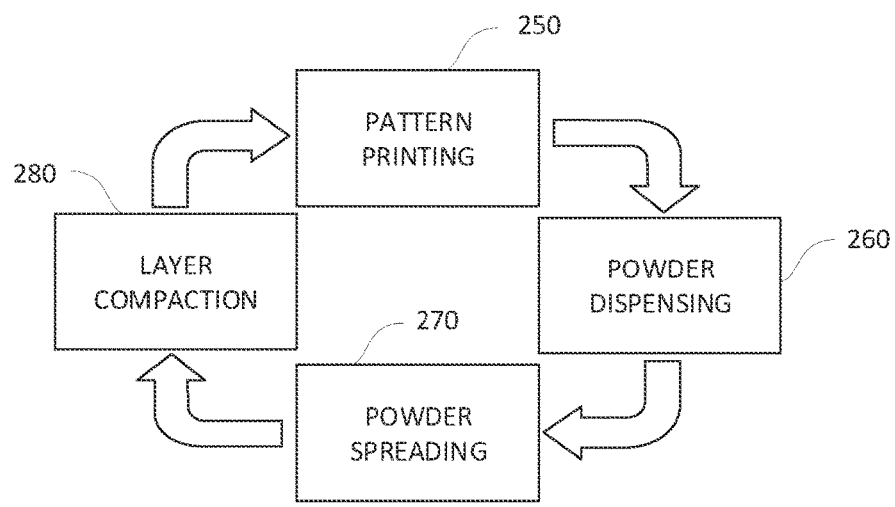
FIG. 3 is a simplified block diagram of an exemplary cyclic process for building layers.

For purposes of better understanding some embodiments of the present invention, as illustrated in FIGS. 4-7 of the drawings, reference is first made to the operation of an additive manufacturing system as illustrated in FIGS. 1-3.

FIG. 1 shows a simplified block diagram of an exemplary additive manufacturing system that may be used to manufacture an object. An additive manufacturing system 100 includes a working platform 500 on which a building tray 200 is advanced through a plurality of stations for building a green block 15, e.g. a block of powder layers, one layer at a time. The green block may include the object in a green compact form, e.g. green body. Typically, a precision stage 250 advances building tray 200 to each of the stations in a cyclic process. The stations may include a printing platform station 30, for printing a pattern of a non-powder solidifiable material, a powder dispensing station 10 for dispensing a powder layer, a powder spreading station 20 for spreading the layer of dispensed powder, and a compacting station 40 for compacting the layer of powder and/or the printed pattern. Typically for each layer, building tray 200 advances to each of the stations and then repeats the process until all the layers have been printed. A controller 300 controls operation of each of the stations on a working platform 500 and coordinates operation of each of the stations with positioning and/or movement of tray 200 on precision stage 250.

The additive manufacturing system may include an additional compacting station 60 to further compress the green block manufactured on working platform 500 after the layer building process is completed.

Green block 15 built on building tray 200 may include a plurality of green usable models (objects in green compact form, i.e. green bodies), e.g. 1-15 models. An example footprint of the block may be 20×20 cm. The green usable models may be extracted from green block 15 and sintered in sintering station 70 as a final step in the manufacturing process.

As used herein, the terms "green block" and "green compact" are interchangeable and refer to a "block", a "compact", "compacts of usable models", "bodies", and "compacts of support elements" whose main constituent is a bound material, typically in the form of bonded powder, prior to undergoing a sintering process. Further as used herein, "green compacts of usable models," "objects in green compact form," and "green bodies" are interchangeable. The terms "object", "model" and "usable model" as used herein are interchangeable.

Temperatures and duration of sintering typically depends on the powder material used and optionally on the size of the object. Optionally sintering is performed in an inert gas environment. Optionally, an inert gas source 511 is a source of nitrogen.

Sintering station 70 and additional compacting station 60 may be standalone stations that are separated from working platform 500. Optionally, green block 15 or the green bodies within green block 15 is manually positioned into additional compacting station 60 and then into sintering station 70, and not via precision stage 250. Optionally, each of additional compacting station 60 and sintering station 70 have a separate controller for operating the respective station.

FIG. 2 is a simplified schematic drawing of an exemplary per layer building process. FIG. 2 shows an example third layer 506 in the process of being built over an example first layer 502 and second layer 504. A pattern 510 is dispensed per layer with a three-dimensional printer. A portion of pattern 510 within second layer 504 is shown at 510A. Pattern 510 is formed from a solidifiable non-powder material such as a solidifiable ink. Powder 51 is spread over the pattern 510 and across a footprint of a building tray 200 with a roller 25 with an axle 24.

FIG. 3 is a simplified block diagram of an exemplary cyclic process for building green block layers in accordance with some embodiments of the present invention. An object (i.e. a green compact of a usable model) may be constructed layer by layer within a green block in a cyclic process. Each cycle of the cyclic process may include the steps of printing a pattern (block 250) at a printing platform station 30, dispensing (block 260) and spreading (block 270) a powder material over the pattern at a dispensing station 10 and a spreading station 20, and compacting the powder layer including the pattern (block 280) at a compacting station 40. Dispensing and spreading stations 10 and 20 may be combined into one single station also referred to as a "powder delivery station". The pattern may be formed from a solidifiable non-powder material such as a solidifiable ink. Compaction may comprise die compaction per layer. Each cycle forms one layer of the green block and the cycle is repeated until all the layers have been built. Optionally, one or more layers may not require a pattern and the step of printing the pattern (block 250) may be excluded from selected layers. Optionally, one or more layers may not require powder material and the step of dispensing and spreading a powder material (blocks 260 and 270) may be excluded from selected layers. This cyclic process yields a green block, which includes one or more green compacts of usable models, one or more green compacts of support elements and a solidified non-powder material. The green usable models may be extracted from green block and sintered as a final step in the manufacturing process. Optionally, post extraction from the green block and prior to sintering, additional compaction may be performed to compact the green compacts of usable models.

Figure 4:
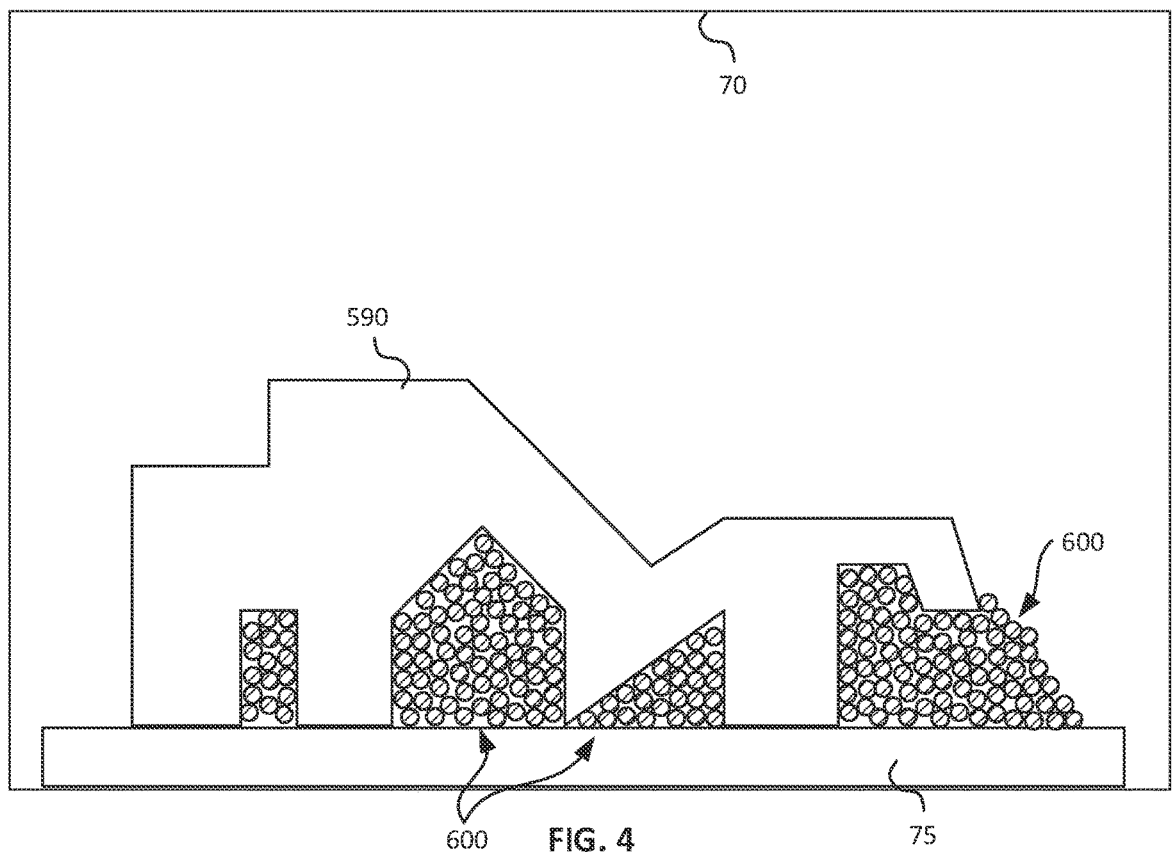
FIG. 4 is a simplified schematic drawing showing example cross-section of an object and pool of balls in a sintering furnace in accordance with some example embodiments.

Referring now to FIGS. 4-7 illustrating and describing some example embodiments of the present invention, FIG. 4 is a simplified schematic drawing showing an example cross-sectional view of an object and a pool of balls in a sintering furnace in accordance with some example embodiments. Object 590 may have a surface defining various gaps, cavities, overhangs and/or protrusions that may be prone to sagging during sintering. In some example embodiments, object 590 is formed by an additive manufacturing process with powder material as described in reference to FIGS. 1-3. Optionally, object 590 is extracted from a green block 15 (FIG. 1) and sintered to further strengthen bonding of the material at the end of the layer building process. Optionally, prior to sintering, object 590 or green block 15 is compressed to increase density of the powder material forming object 590. Object 590 may alternatively be formed by other known manufacturing processes, e.g. by molding, binder jetting, laser sintering or stereolitography. Optionally, object 590 is formed from aluminum, e.g. from powder aluminum. Object 590 may also be formed for example with an aluminum alloy powder, powdered ceramic material, powdered plastic polymer material or any combination of powdered materials.

According to some example embodiments, a pool of balls 600 is positioned in gaps, cavities, around protrusions and/or under overhangs defined by object 590 to physically support and preserve shape of object 590 during sintering. Balls 600 may have a diameter between 1 mm-10 mm, e.g. 2 mm-6 mm or 2 mm-3 mm and may have a generally spherical shape. Although, the ball diameter is configured to be small as compared to dimensions of object 590, balls 600 are significantly larger than sand particles that may otherwise be used to support shape of object 590. Particles of sand may be for example 100 mesh or 200 μm-300 μm.

Optionally, the diameter of balls 600 is defined based on the size of object 590 as well as the geometry of the crevices, gaps etc. which balls 600 are configured to fill or surround. Balls 600 are configured to be small enough to provide enough points of contact with object 590 for supporting the object during sintering while still large enough to enable air flow therebetween. Air flow, may provide for purging of the atmosphere around object to enable oxygen and moisture to be released from the vicinity of object 590 and may also improve thermal conductivity across the bath or pool of balls 600.

In some example embodiments, balls 600 are configured to have a uniform diameter. In other example embodiments, more than one size for balls 600 may be used to support object 590. When different sized balls are used, they may be mixed or alternatively positioned around different portions of object 590. For example, a specific cavity in object 590 may be filled with smaller size balls while other gaps, cavities and/or overhangs may be filled with larger size balls. Optionally, some volumes around object 590 may be filled with a mix of different diameter balls while other volumes around object 590 may be filled with uniform sized balls.

According to some example embodiments, object 590 with pool of balls 600 are positioned over a supporting tray 75 in sintering furnace 70 and object 590 is sintered together with balls 600.

In some example embodiments, balls 600 are formed with aluminum. Optionally, the balls are formed from ceramics, e.g. boron nitride or aluminum nitride. Optionally, balls 600 are solid. In some example embodiments, balls 600 are configured with a smooth outer surface. Balls with smooth surfaces are less likely to adhere to the object during sintering. Optionally, balls 600 include an oxide layer and/or may be chemically treated to provide a desired oxide layer. Balls 600 are configured to stay intact over sintering and not undergo liquefaction.

Figure 5:
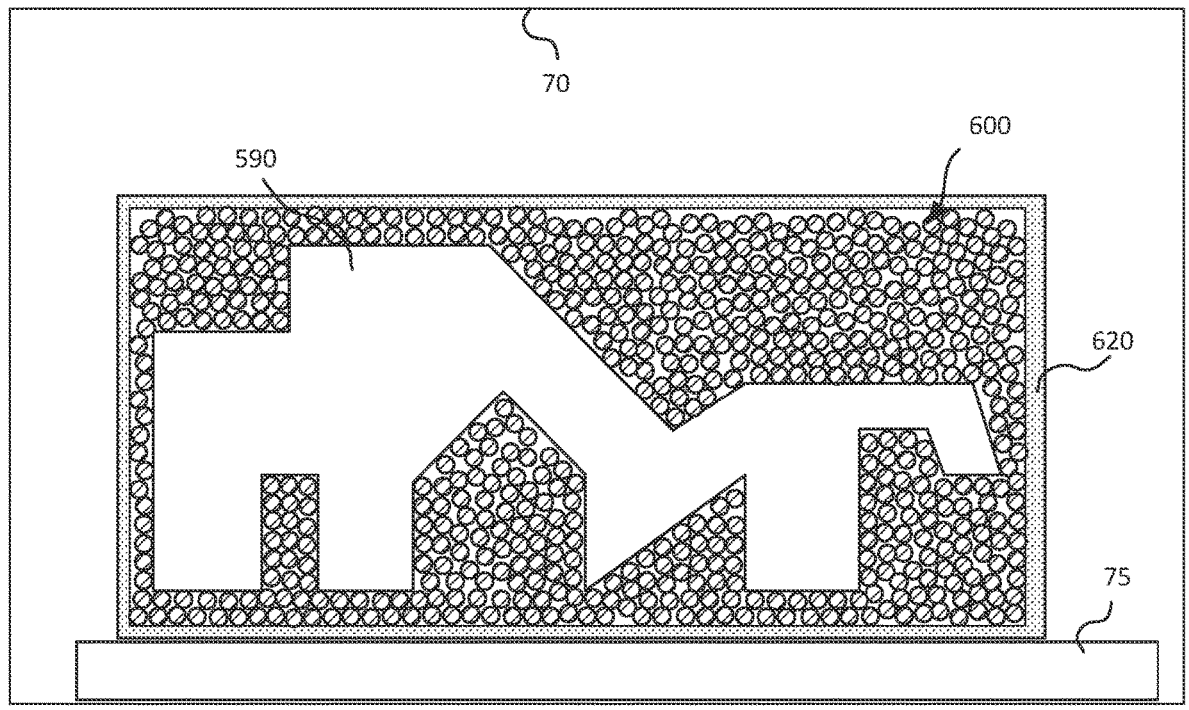
FIG. 5 is a simplified schematic drawing showing an example cross-section of an object immersed in a pool of balls in accordance with some example embodiments.

FIG. 5 is a simplified schematic drawing showing an example cross-section of an object fully immersed in a pool of balls in accordance with some example embodiments. In some example embodiments, object 590 may be sintered while fully immersed in pool of balls 600. Optionally, object 590 and balls 600 are positioned in a cage 620. Cage 620 may be a frame having mesh walls, e.g. a stainless steel mesh, copper mesh or other material that does not liquefy during sintering.

Figure 6A:
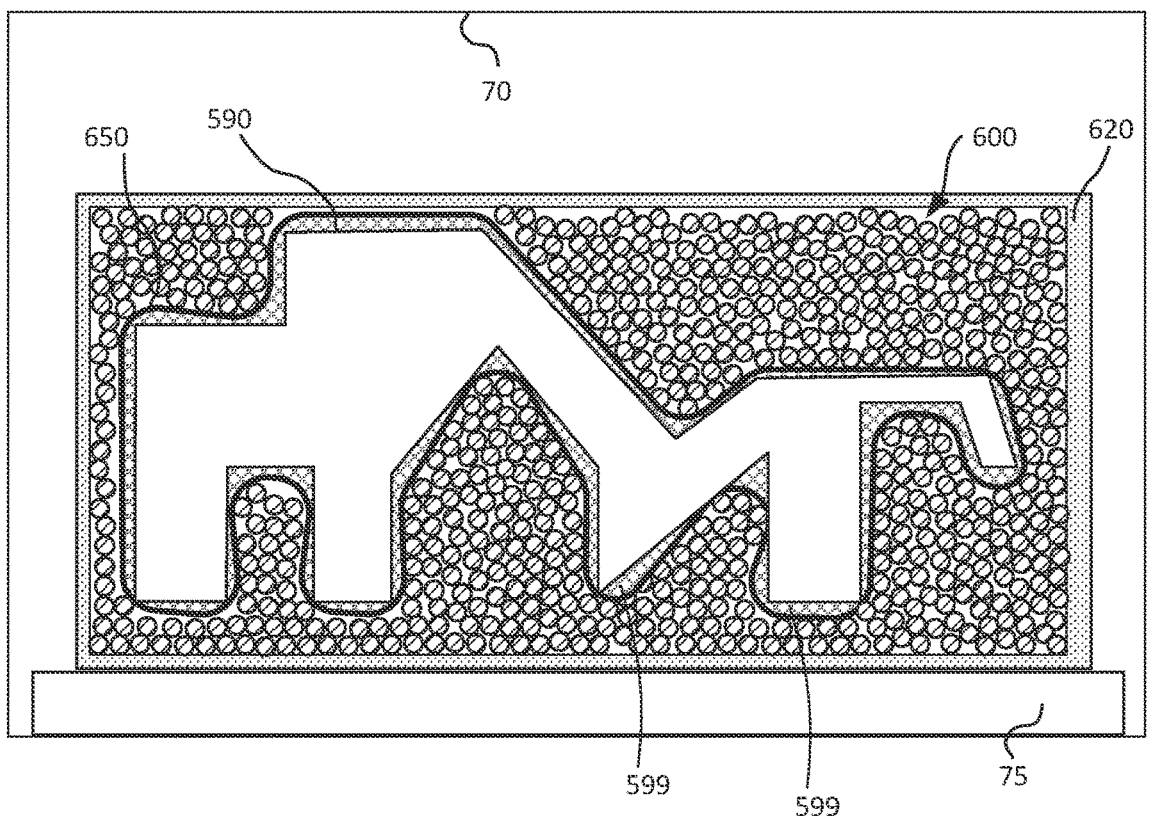
FIG. 6A is a simplified schematic drawing showing an example cross-section of an object wrapped in a mesh and surrounded with balls in accordance with some example embodiments.

FIG. 6A is a simplified schematic drawing showing an example cross-section of an object wrapped in a bag and surrounded with balls in accordance with some example embodiments. In some example embodiments, sticking of balls 600 to a surface of object 590 may be avoided by separating object 590 from balls 600 with a layer of inert sand 599. Optionally, sand 599 is contained in a wrapping or bag 650 and the object 590 is inserted in bag 650 and immersed in inert sand 599. Optionally, bag 650 may also be used when only a portion of object 590 is surrounded with pool of balls 600 as shown in FIG. 4. Bag 650 may be a flexible mesh that is generally configured to take the form of object 590. Bag 650 may be formed from stainless steel, copper or other material that does not liquefy during sintering.

Figure 6B:
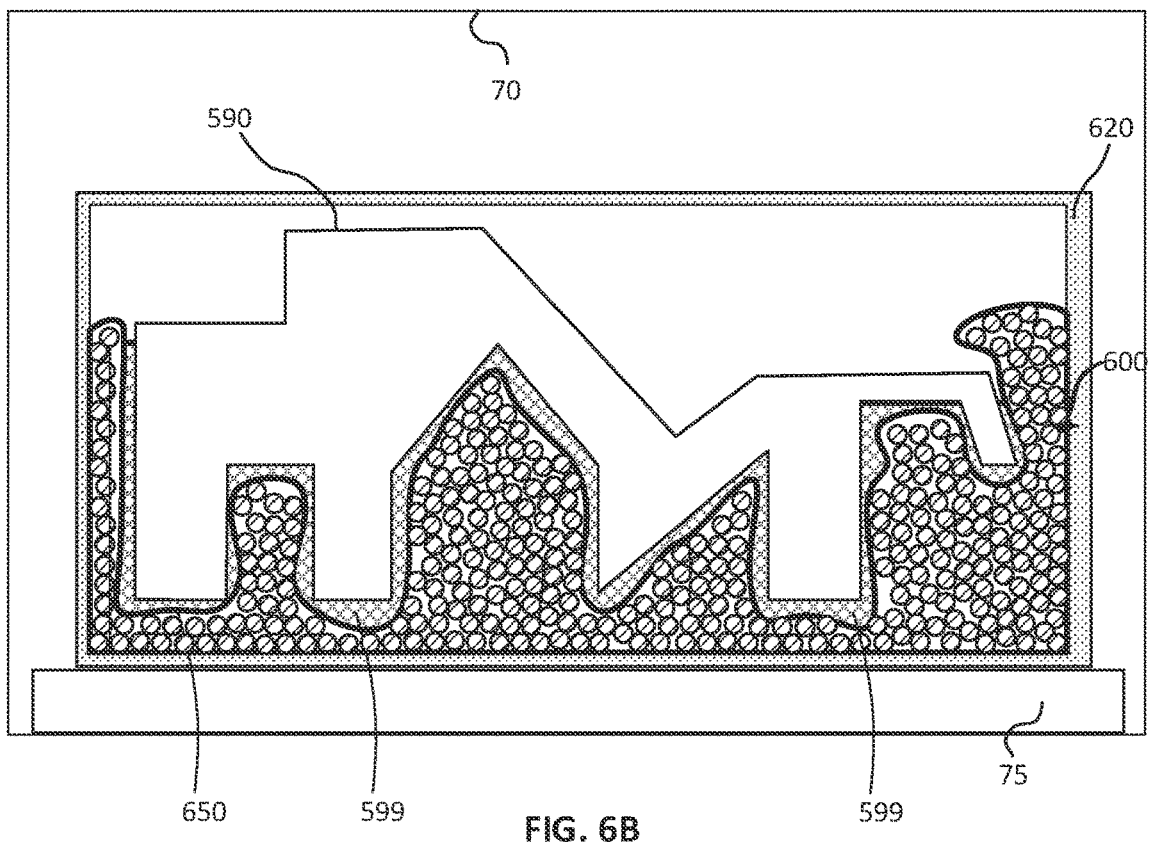
FIG. 6B is a simplified schematic drawing showing an example cross-section of an object placed on in a mesh filled with balls in accordance with some example embodiments.

FIG. 6B is a simplified schematic drawing showing an example cross-section of an object positioned on a mesh filled with balls in accordance with some example embodiments, In FIG. 6B, balls 600 are held in bag 650 and object 590 is positioned over bag 650 including balls 600. Bag 650 and object are separated by a layer of inert sand 599. In some example embodiments, more than one bag of balls may be placed around object 590 for support. Bags 650 may be placed on the bottom of object 590, on the sides and/or on top of object 590. Inert sand 599 may partially or fully surround object 590. Optionally, bags 650 may provide physical separation between a plurality of objects 590 that are sintered concurrently in sintering furnace 70.

Figure 7:
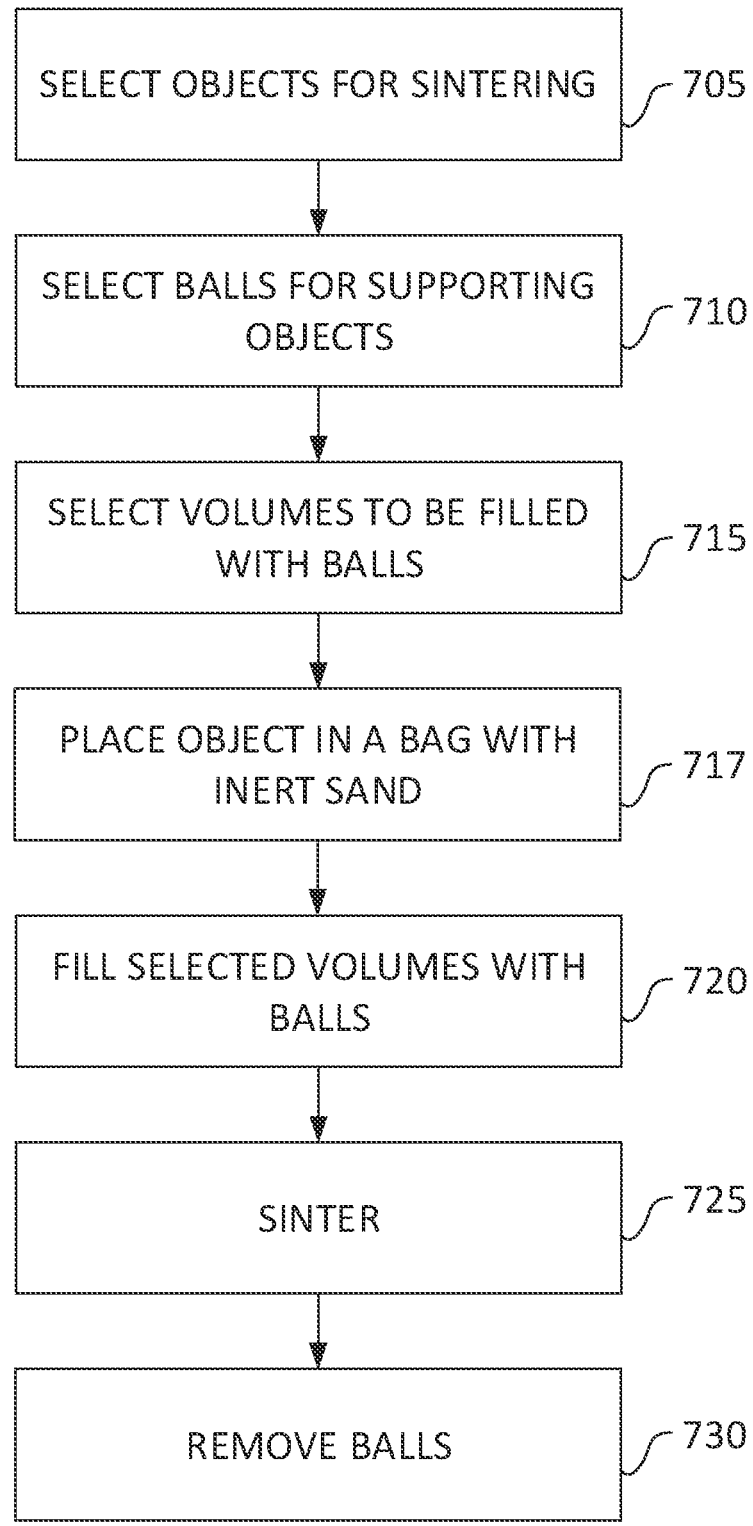
FIG. 7 is a simplified flow chart of an example method for sintering an object in accordance with some example embodiments.

FIG. 7 is a simplified flow chart of an example method for sintering an object in accordance with some example embodiments. One or more objects to be sintered may be selected (705). In some example embodiments, the objects are green usable models extracted from a green block. Optionally, the objects are formed from powdered aluminum. Balls for supporting geometry of the objects may be selected (block 710). Optionally, one or more of diameter, material and shape of the balls may be selected. Optionally, the diameter is selected based on size and geometry of the object that it is supporting.

In some example embodiments, volumes that are configured to be filled or otherwise supported with the balls are selected (block 715) and the selected volumes may be filled with the balls. Alternatively, the entire object or more than one object is immersed in a bath of the balls. Optionally, the object is placed in a bag including inert sand (block 717) prior to filling portions of the object or immersing the entire object in a pool of balls. The selected portions are filled or the object is then immersed in the pool of balls (block 720). According to some example embodiments, the object (or more than one object) is sintered together with the balls (block 725). At the end of the sintering process, the balls (and optionally the sand) are removed or separated from the object (block 730).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Sintering baskets with dimensions 30 cm×30 cm×30 cm were filled with s or sand. Thermocouples were placed at the center of each basket at a depth of about 2 cm below an upper surface of the basket. The baskets were placed in a sintering oven. The temperature gradient is based on the measurements between the pair of thermocouples in each basket. Purging was measured by a moisture gauge and defined as <0.1% rH.

TABLE 1

| Media | Heating Duration (hours) | Temperature Gradient (°) | Atmosphere Purging Duration (hours) |
|---|---|---|---|
| alumina sand (100 mesh [about 150 μm]) | 7 | 15 | >7 |
| aluminum balls (3 mm diameter) | 5 | 6 | 2 |

As can be seen in Table 1, the duration required for sintering may be reduced based on using balls in place of sand to support geometry of an object. Furthermore, the temperature gradient measured was smaller when using aluminum balls and the atmosphere purging duration was also smaller.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for preserving the shape of an object during sintering, the method comprising:
   immersing the object in a pool of balls such that said balls engage at least a portion of an outer surface of the object both from below the object and from above the object, wherein the pool of balls is housed in a cage formed with a mesh or grid;
   while the object is immersed in the pool, sintering the object together with the balls; and
   separating the object from the balls post sintering.

2. The method according to claim 1, wherein the cage is formed from stainless steel.

3. The method according to claim 1, wherein the balls are formed with aluminum.

4. The method according to claim 1, wherein the balls are formed with ceramic material.

5. The method according to claim 4, wherein the ceramic material is boron nitride or aluminum nitride.

6. The method according to claim 1, wherein the balls are solid balls.

7. The method according to claim 1, wherein the balls include an oxide layer.

8. The method according to claim 7, wherein the balls are treated to increase thickness of the oxide layer.

9. The method according to claim 1, wherein the balls are spherical in shape.

10. The method according to claim 1, wherein the balls have a same diameter.

11. The method according to claim 1, wherein the balls have different diameters.

12. The method according to claim 1, wherein a first volume defined by the surface of the object is filled with balls having a first diameter and a second volume defined by the surface of the object is filled with balls having a second diameter, wherein the second diameter is other than the first diameter.

13. The method according to claim 1, wherein a size of the balls is selected based on a size and shape of the object.

14. The method according to claim 1, wherein the balls have a diameter of 2 mm-6 mm selected so as to allow air flow.

15. The method according to claim 1, wherein the object is formed by additive manufacturing.

16. The method according to claim 1, wherein the object is formed with aluminum powder.

17. The method according to claim 1, wherein said immersing is such that all parts of the object are below an upper surface of the pool of balls.

18. The method according to claim 1, wherein each ball has a diameter of 0.5 mm-12 mm.

19. A method for preserving the shape of an object during sintering, the method comprising:
    filling at least one volume defined by a surface of the object with a plurality of balls, wherein each ball has a diameter of 0.5 mm-12 mm;
    sintering the object together with the balls; and
    separating the object from the balls post sintering;
    wherein the method comprises forming a barrier between the plurality of balls and the surface of the object with inert sand, and wherein said sintering is of the object including said barrier.

20. The method according to claim 19, comprising placing the object and the inert sand in a bag, wherein said sintering comprises sintering the object in the bag with the inert sand.

21. The method according to claim 20, wherein the bag is formed with a mesh of stainless steel.

22. The method according to claim 19, wherein the balls are contained in a bag and wherein the inert sand forms barrier between the surface of the object and the bag.

23. The method according to claim 22, wherein the bag is formed with a mesh of stainless steel.

* * * * *